April 6, 1954   G. LEVESQUE DU ROSTU   2,674,359
IMPROVEMENTS IN ELECTROMAGNETIC COUPLING DISK
Filed July 11, 1950
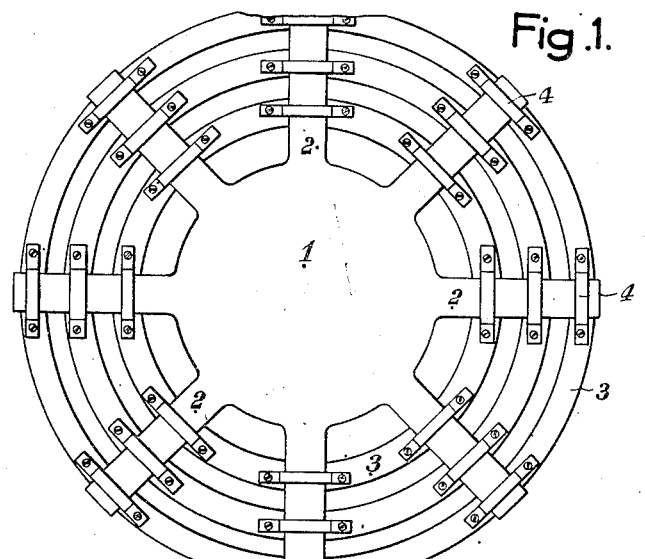
Fig. 1.
Fig. 3.   Fig. 2.
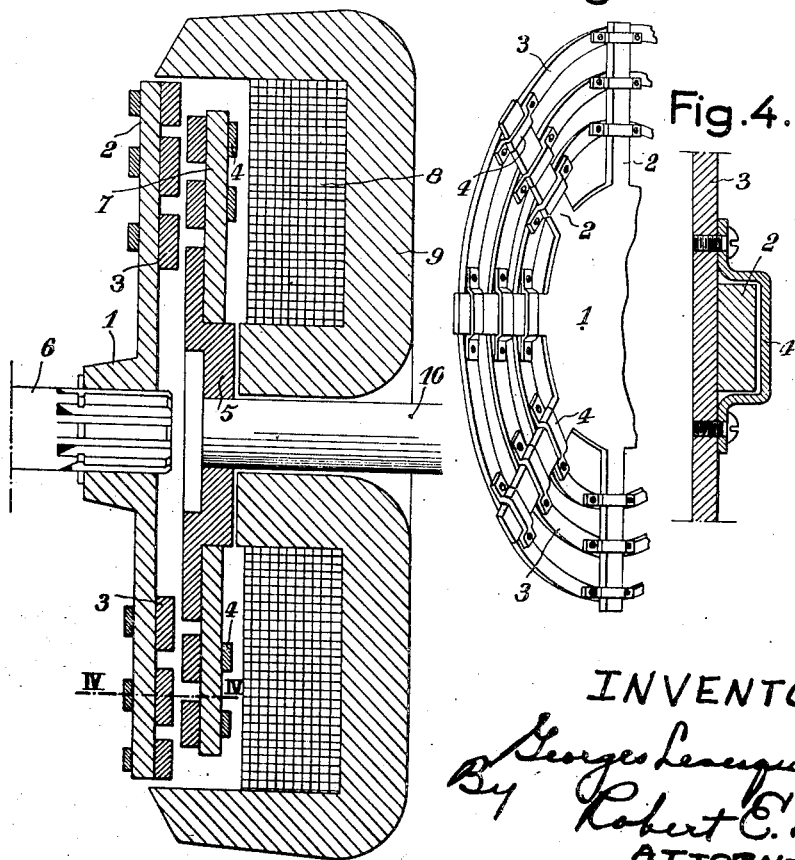
Fig. 4.
INVENTOR
Georges Levesque du Rostu
By Robert E. Burns
ATTORNEY Patented Apr. 6, 1954

2,674,359

UNITED STATES PATENT OFFICE 2,674,359

IMPROVEMENTS IN ELECTROMAGNETIC COUPLING DISK

Georges Levesque du Rostu, Paris, France, assignor to Société Anonyme André Citroën, Paris, France Application July 11, 1950, Serial No. 173,075

Claims priority, application France July 18, 1949

3 Claims. (Cl. 192—84)

Electromagnetic mechanisms are known, such as brakes and clutches, wherein the clutch engagement or the brake application are obtained by the pulling together of discs arranged in an electromagnetic field. It has already been proposed to provide such discs as concentric magnetic metal rings secured to non-magnetic discs. However, difficulties are encountered in operation which are ascribable to the expansion of the rings, which results in a warping of the whole disc system and finally in gripping or lack of adhesion.

The present invention has for its object an arrangement of the said rings whereby same are allowed to expand freely upon friction occurring for the purpose of keeping the two discs perfectly plane.

The said support consists of a plane spider-like support which comprises a central disc of small diameter provided with radially directed arms on which the rings are kept centered by means of stirrups secured to the rings and slidable on the spider arms.

As a result, upon the diameters of the rings varying by the effect of expansion, the said rings will not warp and the pair of discs provided by said rings will remain in contact throughout, whereby a correct transmission of the torque is ensured.

An arrangement of magnetic rings according to the invention will be described more specifically hereinafter, reference being had to the appended drawing in which:

Figure 1 is a front view of the back side of a disc.

Figure 2 is a perspective view of the same.

Figure 3 is a sectional view of a clutch taken through the axis of the same.

Figure 4 is an enlarged detail section taken on line IV—IV in Fig. 3.

Each ring-supporting member consists of a spider comprising a small-diameter non-magnetic metal disc 1, provided with any desired number of radially directed legs 2. A suitable number of suitably dimensioned magnetic metal rings 3 are laid flat on the said radial arms and are held centered on the arms by means of stirrups 5 which are secured to the rings 3 by means of screws, welding or any other method, and fit snugly on the arms 2 (Fig. 4).

By way of example, Fig. 3 illustrates a clutch which comprises a pair of discs 1 and 5 rigid respectively with the driving shaft 6 and the driven shaft 10. Secured on the arms 2 and 7 of said discs in the field of the coil 8 of an electromagnet 9 with the aid of stirrups 4 are the rings 3. This arrangement ensures a perfectly plane engagement of the ring sets irrespective of the rise in temperature caused by friction. The rings expand when heated and their radii accordingly increase. The stirrups 4 are therefore displaced radially outwardly, sliding along the arms 2 and 7 of the spiders 1 and 5 which do not become as hot. Thus, by reason of the way in which the rings 3 are mounted on the spiders, they can expand freely without warping and hence remain flat so that correct engagement of the two sets of rings is assured.

What I claim is:

1. In an electromagnetic coupling mechanism which comprises discs adapted to rotate in a magnetic field, the provision of discs each of which comprises a spider-like support made of a non-magnetic metal, flat rings made of a magnetic metal laid against the arms of said spider-like support and stirrups secured on said rings and slidable on said arms.

2. In an electromagnetic coupling mechanism, a spider-like support made of non-magnetic material and comprising a central hub portion and a plurality of radiating arms, a flat ring of magnetic metal encircling said hub portion and laid against and crossing said arms, and stirrups secured on said ring and slidable on said arms.

3. In an electromagnetic coupling mechanism, a spider-like support comprising a central hub portion and a plurality of spokes of non-magnetic material radiating from said hub, a plurality of flat rings of magnetic metal encircling said hub and disposed concentrically with one another, said rings being laid against and crossing said spokes, and stirrups secured on said rings and slidable on said spokes.

References Cited in the file of this patent

UNITED STATES PATENTS

| Number | Name | Date |
|---|---|---|
| 1,523,413 | Gent | Jan. 20, 1925 |
| 2,098,266 | Walker | Nov. 9, 1937 |
| 2,484,020 | Dungler | Oct. 11, 1949 |

FOREIGN PATENTS

| Number | Country | Date |
|---|---|---|
| 298 | Great Britain | Jan. 4, 1907 |